(12) United States Patent
Baldwin et al.

(10) Patent No.: US 11,298,915 B2
(45) Date of Patent: Apr. 12, 2022

(54) COMPOSITE, STRUCTURAL, INSULATIVE BOARD

(71) Applicant: Specialty Coating & Laminating, LLC, Doswell, VA (US)

(72) Inventors: Geoffrey M. Baldwin, Mechanicsville, VA (US); Joshua A. Elliott, Henrico, VA (US)

(73) Assignee: Specialty Coating & Laminating, LLC, Doswell, VA (US)

( * ) Notice: Subject to any disclaimer, the term of this patent is extended or adjusted under 35 U.S.C. 154(b) by 0 days.

(21) Appl. No.: 16/406,100

(22) Filed: May 8, 2019

(65) Prior Publication Data

US 2019/0344531 A1 Nov. 14, 2019

Related U.S. Application Data

(60) Provisional application No. 62/668,503, filed on May 8, 2018.

(51) Int. Cl.

| | |
|---|---|
| *B32B 5/18* | (2006.01) |
| *B32B 27/06* | (2006.01) |
| *B32B 27/08* | (2006.01) |
| *B32B 27/32* | (2006.01) |
| *B32B 27/36* | (2006.01) |
| *B32B 29/00* | (2006.01) |
| *E04C 2/284* | (2006.01) |
| *E04B 1/62* | (2006.01) |
| *B32B 27/10* | (2006.01) |
| *E04B 1/80* | (2006.01) |

(52) U.S. Cl.
CPC .............. *B32B 5/18* (2013.01); *B32B 27/065* (2013.01); *B32B 27/08* (2013.01); *B32B 27/10* (2013.01); *B32B 27/32* (2013.01); *B32B 27/36* (2013.01); *B32B 29/007* (2013.01); *E04B 1/625* (2013.01); *E04C 2/284* (2013.01); *B32B 2255/10* (2013.01); *B32B 2255/205* (2013.01); *B32B 2264/108* (2013.01); *B32B 2266/0228* (2013.01); *B32B 2266/08* (2013.01); *B32B 2307/724* (2013.01); *B32B 2307/7265* (2013.01); *B32B 2607/00* (2013.01); *E04B 1/80* (2013.01)

(58) Field of Classification Search
CPC ......... B32B 5/18; B32B 27/065; B32B 27/32; B32B 27/36; E04C 2/284; E04B 1/625
See application file for complete search history.

(56) References Cited

U.S. PATENT DOCUMENTS

| | | | | |
|---|---|---|---|---|
| 4,564,554 A | * | 1/1986 | Mikuski | B32B 5/24 428/292.4 |
| 5,352,510 A | * | 10/1994 | Laughlin | B32B 5/20 428/304.4 |
| 6,414,041 B1 | * | 7/2002 | Gluck | C08J 9/0066 521/56 |

(Continued)

*Primary Examiner* — Hai Vo
(74) *Attorney, Agent, or Firm* — John H. Thomas, P.C.

(57) ABSTRACT

A structural sheathing board has multiple functional benefits with respect to structural support, insulation and moisture barrier. A rigid expanded polystyrene core layer has a structural layer laminated to one face thereof and a facer layer laminated to its other face. Each of the structural and facer layers has a water resistant barrier layer laminated to the outside thereof. The water resistant barrier repels liquid water, but in one example, it may allow water vapor to pass through it.

11 Claims, 4 Drawing Sheets

(56) References Cited

U.S. PATENT DOCUMENTS

| | | | |
|---|---|---|---|
| 2004/0014382 A1* | 1/2004 | MacAulay | B32B 27/10 |
| | | | 442/23 |
| 2006/0040091 A1* | 2/2006 | Bletsos | C23C 14/562 |
| | | | 428/137 |
| 2009/0113831 A1* | 5/2009 | DeWildt | B32B 5/20 |
| | | | 52/506.01 |
| 2018/0274234 A1* | 9/2018 | Ciuperca | E04C 2/044 |

* cited by examiner

COMPOSITE, STRUCTURAL, INSULATIVE BOARD

The present application claims the benefit of filing of U.S. Provisional Application No. 62/668,503, filed May 8, 2018, which is incorporated herein by reference in its entirety.

The present invention is directed to sheathing boards using in the building industry, for instance the construction of insulated walls and roofs. Specifically, the present invention is a composite, structural, insulative board product.

BACKGROUND

Composite sheathing products are widely used in the building industry to reinforce wall structure and to contribute to the insulation and weather sealing of a room or building. However, existing sheathing board products suffer various shortcomings and combinations of shortcomings. The structural components of these boards may include oriented strand boards (OSB boards) or laminated paper sheets. By their nature, these layers are porous and can absorb liquid moisture. They also naturally breathe so that air can pass through these layers. These physical constraints limit the insulating performance of the overall sheathing boards that include OSB board and paper sheets. These boards with porous and/or water absorptive surfaces may lead to mold and mildew problems. These layers can be degraded over time such that they cause the sheathing board to lose some or all strength and sealing properties.

Some composite sheathing board products include foam layers to add to the insulating performance of the sheathing board. Commonly deployed foams, however, are open cell foam board products. The porosity of the foam means that absorbed liquid moisture into the foam can degrade the foam and at least degrade the insulating performance of the foam. Composite sheathing boards with porous and/or water absorptive foam components may lead to mold and mildew problems. The foam layers can be degraded over time such that they cause the sheathing board to lose some or all strength and sealing properties.

SUMMARY

Accordingly, it is an object of the present invention to provide a composite structural board that provides both effective insulative performance and breathability that allows water vapor to pass through the board while at the same time protecting the structure from liquid water seeping into the structure. Breathable water resistant barrier layers, or in other examples relatively impermeable barrier layers, are provided on the inside and outside faces of the board to repel water ingress. The composite board described herein also includes a fiberboard structural layer laminated to a graphite-infused foam insulative layer.

In one example, a composite, structural, insulated board for use in building construction comprises a multi-layered board construction comprising a core layer, a structural layer on one side of the core layer, and a facer layer on the opposite side of the core layer from the structural layer. The core layer is comprised of graphite-infused polystyrene foam, wherein the foam is comprised of closed cells, and wherein the core layer has first and second core surfaces on opposite sides of the core layer respectively. The structural layer is laminated to the first side of the core layer, the structural layer having at least one ply of a water resistant barrier layer adjacent a water resistant fiber board layer, wherein the most outside layer of the structural layer is the water resistant barrier layer. The facer layer is laminated to the second side of the core layer, wherein the facer layer has a second water resistant barrier layer as a most outside layer in the facer layer. The density of the foam in the foam core layer may be from about 0.5 to 2 lbs/cubic foot, or alternatively about 0.9 to 1.5 lbs/cubic foot, or still further alternatively about 1 lb/cubic foot. The first and second water resistant barrier layers may be formed of a housewrap material. The core layer thickness may be about $\sfrac{3}{8}^{th}$ to 6 inches, or about ½ to 2 inches. The water resistant barrier layer in the structural layer may be formed of a polyolefin. The water resistant fiber board layer may be formed of kraft paper. The structural layer may have a plurality of plies of water resistant barrier layers and water resistant fiber board layers. The facer layer may be a metallized polyester film, or a breathable reflective/metallized polyolefin film.

DETAILED DESCRIPTION

Figure 1:
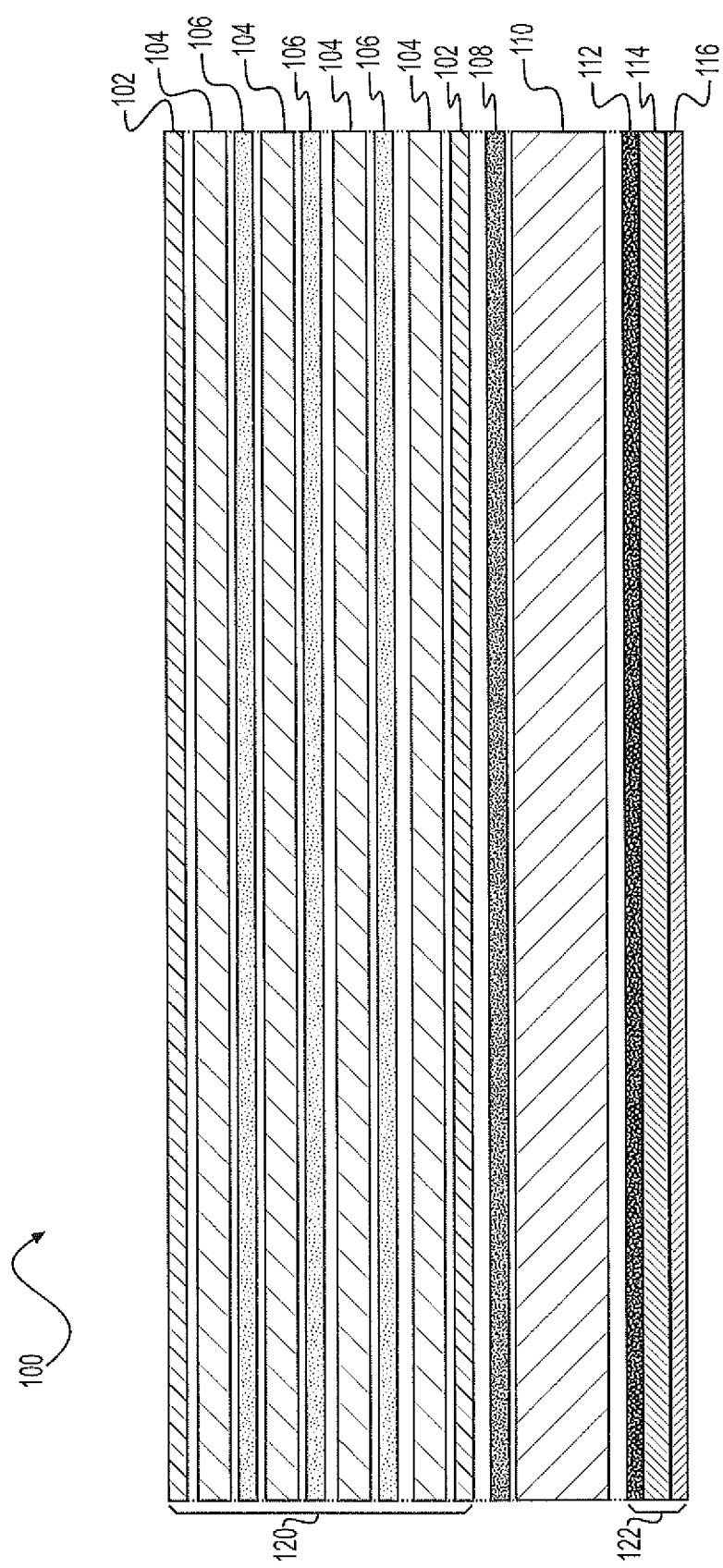
FIG. 1 is a side, cross-sectional, exploded view of an example of a composite, structural, insulative board as described herein.

The sheathing board described herein is a multi-layer panel that addresses structural, insulating and water repellent factors. A core layer is formed of graphite-infused, closed cell polyester foam to maximize the insulating attributes of the composite board. Attached on one side of the core is a structural layer to lend structural stability and water/moisture repellency to the composite board. Laminated to the opposite side of the core is a facer layer. This facer layer is at least a water/moisture repellent layer. This facer layer may or may not be a metallized polyester. Importantly, this board is reversible in that the structural layer may be positioned to face inside the room (adjacent the studs to which it is attached) or outside. In both positions, the multi-layer sheathing board enjoys excellent performance results.

The sheathing board described herein may be used as a structural sheathing board. It may also be used as an insulating roofing underlayment board. Different applications for the board may call for different component constructions. Also, different geographic locations where the sheathing board will be used may call for different component constructions.

The core layer of the sheathing board is formed of closed cell foam beads. This foam is a polystyrene-based foam. To improve the insulative capacity of the foam, the precursor polystyrene beads are infused with graphite so that when those beads are expanded during the foam process they produce a final fused block of graphite infused expanded polystyrene. One commercial example of this foam is the BASF family of Neopor rigid foam products. This foam is available in boards of different thicknesses of from about $3/8^{th}$ of an inch to six inches or even more, although a resulting board can become practically unwieldy if it is too thick.

Alternatively, the foam board may be about ½ an inch to 2 inches thick. The density of the foam may range from about 0.5 to 2 lbs/cubic foot, or alternatively about 0.9 to 1.5 lbs/cubic foot, or in one example about one lb/cubic foot. The amount of graphite infused into the foam is also variable depending for instance on a particular building application or geographic location. The graphite particles increase the insulative capacity of the foam. The thickness of this core layer may be varied depending on the insulating needs of a particular installation job. For example, a core thickness of about one inch may be used with the other sheathing board layers to provide an R-factor of 5. A relatively more thin core layer of about N of an inch may be used to provide an R-factor of about 3. The thickness may be varied according to insulating need.

It is preferred that the foam is not formed through the use of a polyisocyanate mixed with the polyester. A polyisocyanate foam can emit unpleasant and unhealthy gases after installation. Also, a polyisocyanate foam is an open cell structure. This open cell structure can allow the build-up of moisture into the open cells and therefore reduce its insulative value.

An expanded polystyrene foam is preferred in the sheathing board construction. The board is formed from the polystyrene foam beads or pellets depending on the size and end use of the foam. The closed cell structure in these expanded polystyrene foam boards reduces intrusion of liquid water moisture into the cell structure of the body of the foam board. On the other hand, the foam board does have permeability with respect to water vapor so that an installed board can still "breathe" and prevent excessive moisture buildup inside a home or building. As noted earlier, the BASF Neopor rigid foam products have been found to be effective. Other commercially-available, graphite-infused foam boards are also expected to be able to be used as long as the foam is a closed cell foam, preferably expanded polystyrene.

A structural layer is laminated to one side of the foam core layer. This structural layer has multiple layers that form it. In one example, a water resistant barrier layer is laminated to a water resistant fiberboard layer. The fiberboard layer may alternatively have a second water resistant barrier layer laminated to it on the opposite side that the first barrier layer in order to encapsulate the fiberboard layer. In another alternative, there may be multiple layers of fiberboard layer and weather resistant barrier layer. The structural layer of a sheathing board herein can have one or multiple plies in order to meet the structural requirement of this layer. One commercial example of such a fiberboard structural sheathing is the Barricade Thermo-Brace board. Regardless of how many plies there may be, it is essential that the farthest outside of the structural layer, on the other side of the structural layer from the core layer, there is the water resistant barrier layer. This layer is typically a polyethylene or other polymeric material that is substantially impermeable to liquid moisture ingress. This outside protective skin layer protects the fiberboard layers from absorbing moisture and allowing mold to form. It also protects against compositional decay of interior fiberboard layers.

The water resistant barrier layer can be any polymeric material that can substantially block liquid moisture and/or air flow. It may be polyethylene, polyester, PVC, polypropylene or copolymers thereof. This barrier layer may be melt-coated onto the fiberboard layer, or alternatively it may be adhesive-coated and then applied under pressure onto the fiberboard layer.

The fiberboard layer is typically formed using laminated kraft paper having a total laminated thickness of about $1/32$nd to ¼th of an inch, or alternatively about $1/16$th to $3/32$nd of an inch. In one example of a commercially available Barricade Thermo-Brace fiberboard, the fiberboard is a multi-ply of kraft paper and moisture barrier layers with a total thickness of about $1/8^{th}$ on an inch and has a weight of 265-380 lbs. per MSF, or alternatively, 275-350 lbs. per MSF. This thickness of the structural layer is significant for practical reasons. When laminated to a one inch foam board, the resulting sheathing can be installed with nails or staples or similar tools. This is compared with an oriented strand board (OSB) structural layer in other products that is commercially relatively more thick at about $3/8$ of an inch at least. A laminated OSB on a one inch foam board product, therefore, cannot be installed with regular staples. Instead, the OSB on foam boards require use of nails or screws to attach to wall studs and are therefore more time-consuming and labor intensive to install. (Also, the OSB is by its nature very absorbing of water and subject to degradation over time.)

A facer layer is laminated to the opposite side of the core layer from the structural layer. The facer layer is formed of a water resistant barrier material. It may be the same material as the barrier layer described in connection with the structural layer. Its purpose is to prevent liquid moisture from passing into the foam layer. The facer layer may alternatively be a metallized polymer. Still further alternatively, a separate metal foil layer can be laminated to the barrier layer. It is essential that the most outside facer layer is a water barrier layer to prevent or minimize the ingress of liquid moisture into the foam. This facer layer may be melt-coated onto the foam layer. Alternatively, an adhesive may be applied to the back of the facer layer which is then laminated to the foam core layer.

The water resistant barrier layers that are laminated to the inside and outside faces of the sheathing board (on the outward faces of the structural and facing layers respectively) may be impermeable to air and liquid water moisture and to water vapor, or alternatively those layers may be formed of a "breathable" layer such as a housewrap material. A housewrap material is defined as a microporous, monolithic or microperforated coating applied to a substrate, including but not limited to a fabric or paperboard. For the purposes of a structural board as described herein, a housewrap material is defined as a film that repels liquid water but allows water vapor to pass through it. When impermeable water resistant barrier layers are used, e.g. the solid polymer films identified earlier herein, the perm rating, which is the standard measure of the water vapor permeability of a material, of the assembled composite board is between about 0.1 and 1. When the "breathable" housewrap material is used as the water resistant barrier layer, the entire composite board including this layer breathes water vapor at a range of 1-20 perms, and alternatively 1.5-10 perms. The US perm is defined as 1 grain of water vapor per hour, per square foot, per inch of mercury. It is typically tested in accordance with ASTM E96 Procedure a or b.

FIGS. 1-4 illustrate alternative examples of composite, structural, insulated boards as described herein.

FIG. 1 is a structural board 100 having multiple layers. The layers are being referred to from top to bottom of the figure. Of course either side, top or bottom could be the inside or outside of the installed board. Layer 102 is a polyethylene film. Layer 102 is heat or melt laminated onto water resistant paperboard layer 104. The water resistant paperboard layer 104 is then adhered to an adjacent paperboard layer with PVOH adhesive 106. There are four water resistant paperboard layers 104 with PVOH adhesive layers 106 between them. The next layer is a polyethylene layer 102. The total structure of all of these layers between and including the polyethylene layers 102 constitute the structural layer 120 of the board 100. This structural layer 120 is then adhered to the foam core layer 110 by a water-based or hot melt urethane adhesive layer 108. On the opposite side of the core 110 from the structural layer 120 is the facer layer 122. The facer layer 122 is formed of a polyester film 116 with a metalized coating 114 and adhered to the core 110 with a heat sealable EMA or EAA coating 112.

Figure 2:
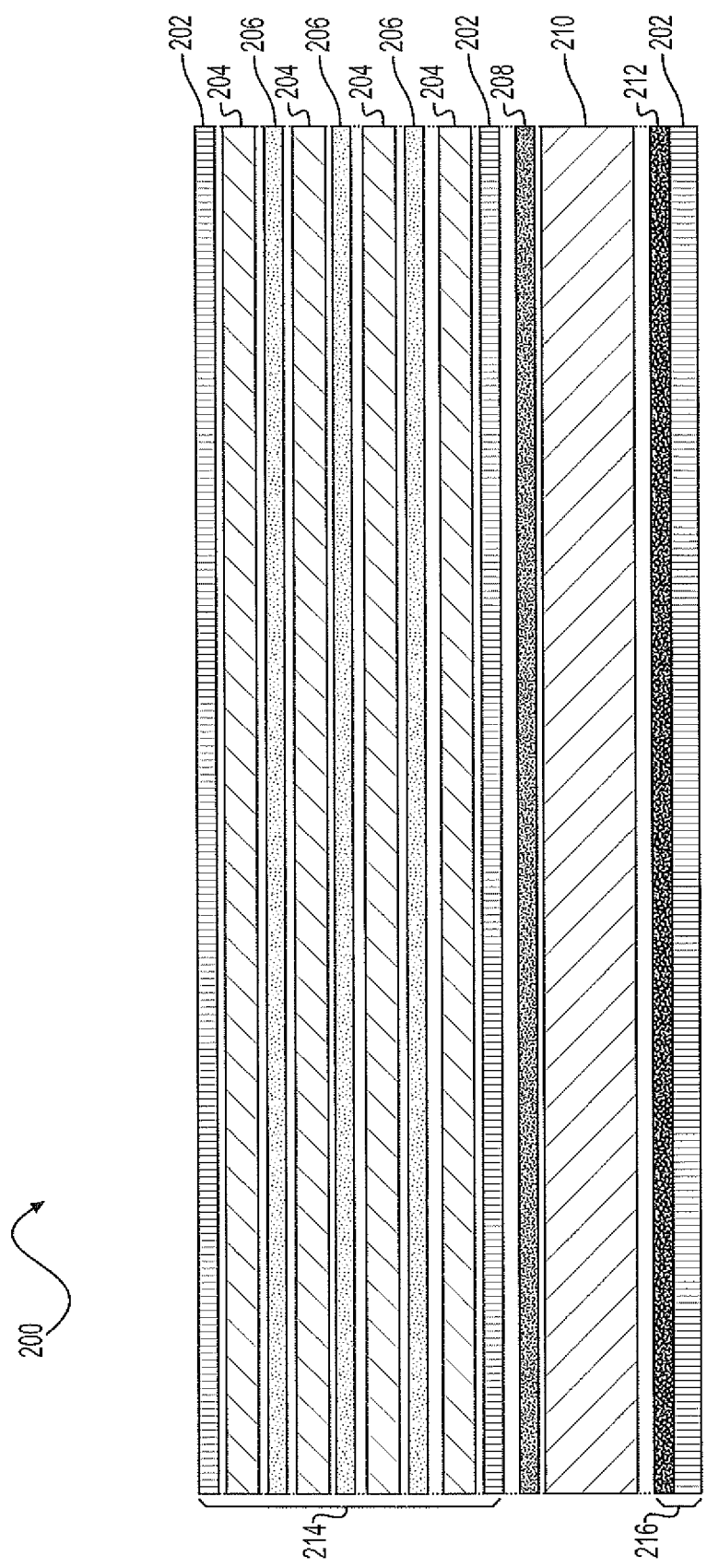
FIG. 2 is a side, cross-sectional, exploded view of a second example of a composite, structural, insulative board as described herein.

FIG. 2 is a structural board 200 having multiple layers. The layers are being referred to from top to bottom of the figure. Of course either side, top or bottom could be the inside or outside of the installed board. Layer 202 is a housewrap. Layer 202 is heat laminated onto water resistant paperboard layer 204. The water resistant paperboard layer 204 is then adhered to an adjacent paperboard layer with PVOH adhesive 206. There are four water resistant paperboard layers 204 with PVOH adhesive layers 206 between them. The next layer is a housewrap layer 202. The total structure of all of these layers between and including the housewrap layers 202 constitute the structural layer 214 of the board 200. This structural layer 214 is then adhered to the foam core layer 210 by a water-based or hot melt urethane adhesive layer 208. On the opposite side of the core 210 from the structural layer 214 is the facer layer 216. The facer layer 216 is formed of a housewrap layer 202 that is adhered to the core 210 by an adhesive 212 that is either a heat seal EMA coating, EAA coating, or water or hot melt urethane adhesive.

Figure 3:
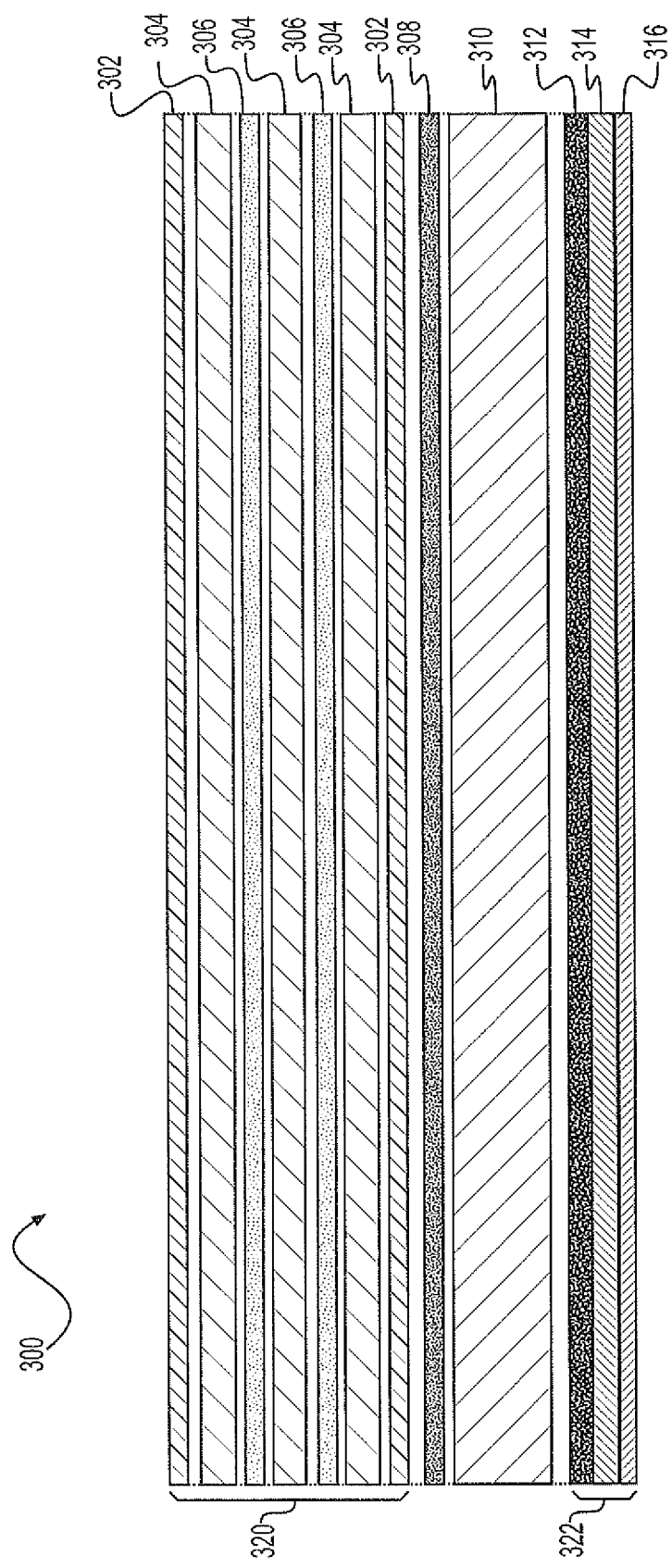
FIG. 3 is a side, cross-sectional, exploded view of a third example of a composite, structural, insulative board as described herein.

FIG. 3 is a structural board 300 having multiple layers. The layers are being referred to from top to bottom of the figure. Of course either side, top or bottom could be the inside or outside of the installed board. Layer 302 is a polyethylene film. Layer 302 is heat or melt laminated onto water resistant paperboard layer 304. The water resistant paperboard layer 304 is then adhered to an adjacent paperboard layer with PVOH adhesive 306. There are three water resistant paperboard layers 304 with PVOH adhesive layers 306 between them. The next layer is a polyethylene layer 302. The total structure of all of these layers between and including the polyethylene layers 302 constitute the structural layer 320 of the board 300. This structural layer 320 is then adhered to the foam core layer 310 by a water-based or hot melt urethane adhesive layer 308. On the opposite side of the core 310 from the structural layer 320 is the facer layer 322. The facer layer 322 is formed of a polyester film 316 with a metalized coating 314 and adhered to the core 310 with a heat sealable EMA or EAA coating 312.

Figure 4:
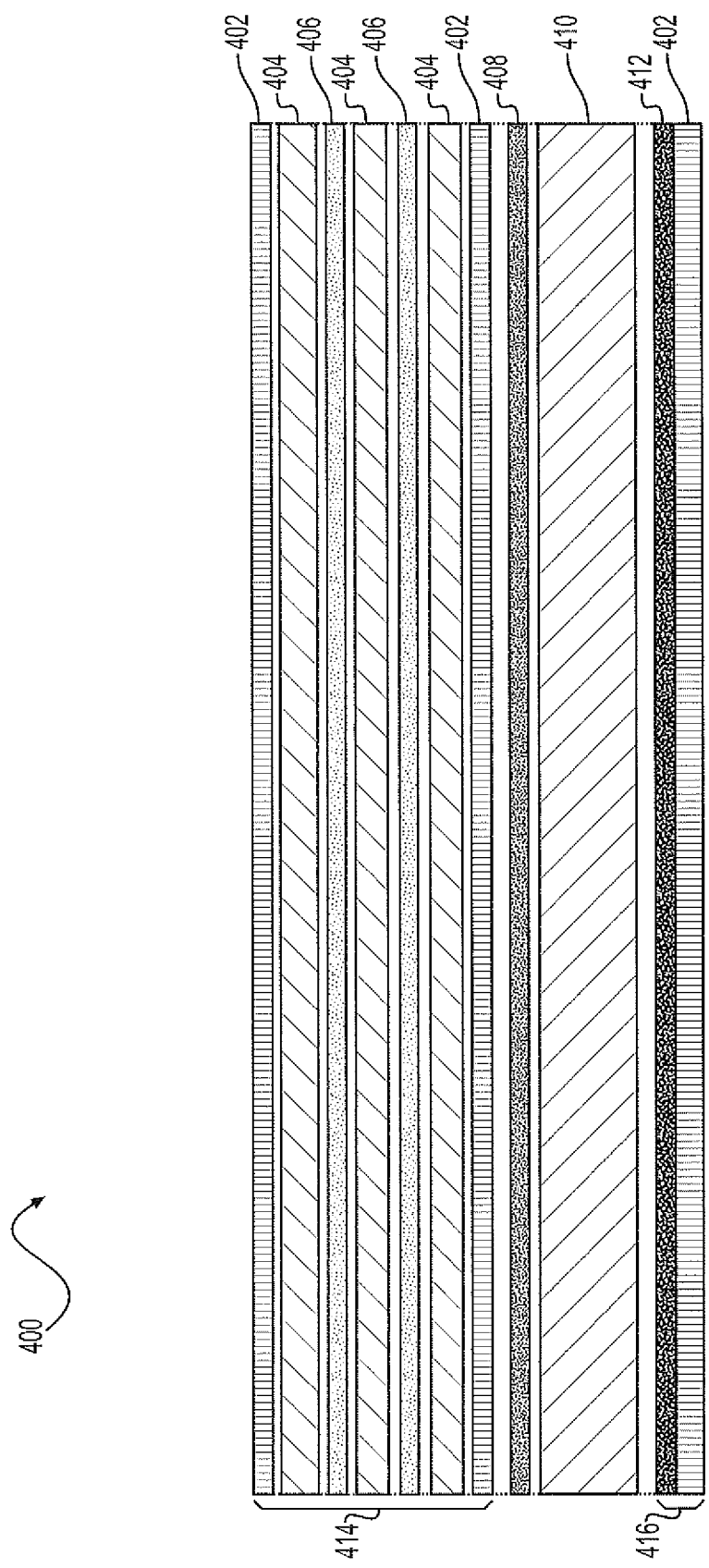
FIG. 4 is a side, cross-sectional, exploded view of a fourth example of a composite, structural, insulative board as described herein.

FIG. 4 is a structural board 400 having multiple layers. The layers are being referred to from top to bottom of the figure. Of course either side, top or bottom could be the inside or outside of the installed board. Layer 402 is a housewrap. Layer 402 is heat laminated onto water resistant paperboard layer 404. The water resistant paperboard layer 404 is then adhered to an adjacent paperboard layer with PVOH adhesive 406. There are four water resistant paperboard layers 404 with PVOH adhesive layers 406 between them. The next layer is a housewrap layer 402. The total structure of all of these layers between and including the housewrap layers 402 constitute the structural layer 414 of the board 400. This structural layer 414 is then adhered to the foam core layer 410 by a water-based or hot melt urethane adhesive layer 408. On the opposite side of the core 410 from the structural layer 414 is the facer layer 416. The facer layer 416 is formed of a housewrap layer 402 that is adhered to the core 410 by an adhesive 412 that is either a heat seal EMA coating, EAA coating, or water or hot melt urethane adhesive.

Other embodiments of the present invention will be apparent to those skilled in the art from consideration of the specification. It is intended that the specification and figures be considered as exemplary only, with a true scope and spirit of the invention being indicated by the following claims.

That which is claimed is:

1. A composite, structural, insulated board for use in building construction, comprising:
   a multi-layered board construction comprising a core layer, a structural layer on one side of the core layer, and a facer layer on the opposite side of the core layer from the structural layer;
   wherein the core layer is comprised of graphite-infused polystyrene foam, wherein the foam is comprised of closed cells, and wherein the core layer has first and second core surfaces on opposite sides of the core layer respectively;
   wherein the structural layer has an inside layer and an outside layer, and the inside layer of the structural layer is laminated to the first side of the core layer, the structural layer having at least one ply of a first water resistant barrier layer adjacent a water resistant fiber board layer, wherein the fiber board layer comprises a laminate of a plurality of paperboard layers, wherein the farthest outside layer of the structural layer, on the other side of the structural layer from the core layer, is the first water resistant barrier layer, and further wherein the thickness of the structural layer is between about $1/32^{nd}$ to $1/4^{th}$ of an inch and has a weight of 265-380 lbs. per MSF;
   wherein the facer layer is laminated to the second side of the core layer, wherein the facer layer has a second water resistant barrier layer as an outermost layer of the facer layer;
   wherein the first water resistant barrier layer is formed of a polyolefin,
   wherein the second water resistant barrier layer is formed of a polyolefin,
   and wherein the first and second water resistant barrier layers are formed of a housewrap material which is a microporous, monolithic or microperforated coating applied to a substrate.

2. A composite, structural, insulated board for use in building construction as described in claim 1,
   wherein density of the foam in the foam core layer is from about 0.5 to 2 lbs/cubic foot.

3. A composite, structural, insulated board for use in building construction as described in claim 1,
   wherein density of the foam in the foam core layer is from about 0.9 to 1.5 lbs/cubic foot.

4. A composite, structural, insulated board for use in building construction as described in claim 1,
   wherein density of the foam in the foam core layer is about 1 lb/cubic foot.

5. A composite, structural, insulated board for use in building construction as described in claim 1,
   wherein the core layer thickness is about $3/8^{th}$ to 6 inches.

6. A composite, structural, insulated board for use in building construction as described in claim 1,
   wherein the core layer thickness is about $1/2$ to 2 inches.

7. A composite, structural, insulated board for use in building construction as described in claim 1,
wherein the water resistant fiber board layer is formed of kraft paper.

8. A composite, structural, insulated board for use in building construction as described in claim 1,
wherein the structural layer has a plurality of plies of water resistant barrier layers and water resistant fiber board layers.

9. A composite, structural, insulated board for use in building construction as described in claim 1,
wherein the facer layer is a breathable reflective/metallized polyolefin film.

10. A composite, structural, insulated board for use in building construction as described in claim 1,
wherein the structural layer has a weight of 275-350 lbs. per MSF.

11. A composite, structural, insulated board for use in building construction as described in claim 1,
wherein the facer layer is a coated, water vapor permeable polyethylene layer.

\* \* \* \* \*